(12) United States Patent
Oster et al.

(10) Patent No.: US 9,194,750 B2
(45) Date of Patent: Nov. 24, 2015

(54) INFRA-RED IMAGER

(75) Inventors: Dov Oster, Reut Modiin (IL); Michael Singer, Kfar Vradim (IL); Alina Koifman, Qiryat Bialik (IL); Tuvy Markovitz, Kfar Vradim (IL)

(73) Assignee: SEMI CONDUCTOR DEVICES—ELBIT SYSTEMS—RAFAEL PARTNERSHIP, Haifa (IL)

( * ) Notice: Subject to any disclaimer, the term of this patent is extended or adjusted under 35 U.S.C. 154(b) by 1030 days.

(21) Appl. No.: 13/291,411

(22) Filed: Nov. 8, 2011

(65) Prior Publication Data

US 2012/0105646 A1 May 3, 2012

Related U.S. Application Data

(63) Continuation-in-part of application No. 12/897,267, filed on Oct. 4, 2010, now abandoned.

(60) Provisional application No. 61/249,320, filed on Oct. 7, 2009.

(51) Int. Cl.
*G01J 5/06* (2006.01)
*G01J 5/08* (2006.01)
(Continued)

(52) U.S. Cl.
CPC .. *G01J 5/06* (2013.01); *G01J 5/061* (2013.01); *G01J 5/08* (2013.01); *G01J 5/0806* (2013.01); *G01J 2005/0077* (2013.01); *G01J 2005/065* (2013.01); *G01J 2005/607* (2013.01)

(58) Field of Classification Search
CPC ....... G01J 5/061; G01J 5/08; G01J 2005/065; G01J 5/0815; G01J 5/06; G01J 5/10; G01J 1/0422; G01J 2005/607; G01J 3/0294; H04N 5/33; H04N 3/09; G02B 19/0076; G02B 19/009; G02B 5/208; G01N 21/35
USPC .................................. 348/164; 250/352, 332
See application file for complete search history.

(56) References Cited

U.S. PATENT DOCUMENTS 4,507,551 A 3/1985 Howard et al.
4,740,702 A * 4/1988 Huang et al. .................. 250/352
(Continued)

FOREIGN PATENT DOCUMENTS

WO WO 2010/040914 A2 4/2010

OTHER PUBLICATIONS

Fendler et al., "Integration of Optical Functions in the Dewar for Compact IR Cameras," *LETI, Annual Research Report, Optics & Photonics*, 2011, pp. 18.

*Primary Examiner* — Sath V Perungavoor
*Assistant Examiner* — Nathnael Aynalem
(74) *Attorney, Agent, or Firm* — Oliff PLC

(57) ABSTRACT

An infrared (IR) imaging system is presented. The system includes a cooling chamber associated with a cooler generating a certain temperature condition inside the chamber. The cooling chamber has an optical window, and includes thereinside an IR detection unit including one or more detectors thermally coupled to the cooler and at least two cold shields thermally coupled to the cooler and carrying at least two imaging optical assemblies. The at least two imaging optical assemblies are enclosed by the cold shields in between the detection unit and the optical window and thereby define at least two different optical channels for imaging light from the optical window onto the one or more detectors of the detection unit.

19 Claims, 4 Drawing Sheets

(51) Int. Cl.
  *G01J 5/00*  (2006.01)
  *G01J 5/60*  (2006.01)

(56) References Cited

U.S. PATENT DOCUMENTS

| | | | |
|---|---|---|---|
| 4,820,923 A | | 4/1989 | Wellman |
| 4,827,130 A | | 5/1989 | Reno |
| 4,862,002 A | * | 8/1989 | Wang et al. ................ 250/352 |
| 4,937,450 A | | 6/1990 | Wakabayashi et al. |
| 5,179,283 A | * | 1/1993 | Cockrum et al. ............ 250/352 |
| 5,258,618 A | | 11/1993 | Noble |
| 5,260,575 A | * | 11/1993 | Iwasaki et al. .............. 250/352 |
| 5,378,892 A | | 1/1995 | Levy et al. |
| 5,408,100 A | * | 4/1995 | Gallivan ...................... 250/352 |
| 5,841,589 A | * | 11/1998 | Davis et al. .................. 359/726 |
| 6,057,550 A | | 5/2000 | Thoma et al. |
| 6,596,982 B1 | | 7/2003 | Skokan et al. |
| 6,969,840 B1 | | 11/2005 | Theriault et al. |
| 7,180,067 B2 | | 2/2007 | Wolske |
| 2005/0078208 A1 | | 4/2005 | Minarik et al. |
| 2005/0180026 A1 | * | 8/2005 | Pohle ............................ 359/726 |
| 2008/0291954 A1 | * | 11/2008 | Aphek et al. .................. 372/34 |
| 2009/0224156 A1 | | 9/2009 | Gibbons et al. |

* cited by examiner

General Art

INFRA-RED IMAGER

This is a Continuation-in-Part of U.S. patent application Ser. No. 12/897,267 filed Oct. 4, 2010, which claims the benefit of U.S. Provisional Application No. 61/249,320 filed Jul. 10, 2009. The disclosure of the prior applications is hereby incorporated by reference herein in its entirety.

FIELD OF THE INVENTION

The invention is generally in the field of imaging techniques and relates to an Infra-Red (IR) imager.

BACKGROUND OF THE INVENTION

Typically, the conventional IR detectors are of a type requiring cooling of the light detection element (detecting IR radiation). The conventional IR detectors, for example Focal Plane Array (FPA) detectors, are usually cooled to a cryogenic temperature and are typically associated with (e.g. enclosed within) cryogenically cooled Dewar. The latter includes a cold shield and a cold filter of the Dewar, and has a Dewar enclosure including a warm optical window as a part thereof. The detector is placed in a housing and is located behind the cold shield and cold filter. The cooling mechanism (which typically cools also the cold shield and the cold filter) supports the increase of the signal-to-noise ratio of the IR radiation detection by reducing a thermal noise (in the IR spectral range), namely noise associated with thermal emission from the detector housing which is disposed to environment. The cold shield is typically configured for reducing the thermal noise from the detected signal by minimizing the IR radiation that arrives to the detector from regions out of the field of view of the complete system.

Such cooled IR detectors typically utilize an IR radiation-sensitive detection module (e.g. FPA detector), a cold shield and a cold filter. FIG. 1 exemplifies a conventional detector Dewar assembly 10. As shown, the assembly 10 includes a light sensitive element (detector) 12, enclosed inside a Dewar (housing) 14. The housing 14 has an optical window 16, collecting IR radiation to be sensed by detector 12. The optical window 16 is thus a part of the Dewar enclosure. The housing 14 with the window is exposed to environment, the optical window is thus called "warm window". The housing contains a cold shield 18 surrounding the detector element 12 and being thermally isolated from inner surface of the enclosure 14 by vacuum and by a low emissivity coating of the outer surface of the shield 18. The cold shield carries a cold filter 20. The detector element 12 is coupled to an internal cryogenic cooler 22.

Various techniques have been developed for reducing the thermal noise in IR detection systems. For example, U.S. Pat. No. 4,820,923 describes an uncooled reflective shield for cryogenically cooled radiation detectors. Here, a warm shield reflector is used with a cryogenically cooled radiation detector. The warm shield has a reflective surface of toroidal shape. The surface has geometric properties which cause a ray emanating from the detector to be reflected such that a ray is imaged as a defocused ring outside of and surrounding the active detector area. Several such segments are located in front of a small, cryogenically cooled detector shield, to provide an overall detector shielding effect similar to that of a larger, cryogenically cooled shield.

U.S. Pat. No. 6,969,840 discloses an all-reflective telescope which has, in order, a positive-optical-power primary mirror, a negative-optical-power secondary mirror, a positive-optical-power tertiary mirror, a negative-optical-power quaternary mirror, and a positive-optical-power field lens. The mirrors and lens are axisymmetric about a beam axis. The light beam is incident upon an infrared detector after reflecting from the quaternary mirror. A cooling housing encloses the detector and the field lens, but does not enclose any of the mirrors. An uncooled warm-stop structure outside of the cooling housing but in a field of view of the detector is formed as a plurality of facets with reflective surfaces oriented to reflect a view of an interior of the cooling housing back to the interior of the cooling housing.

U.S. Pat. No. 7,180,067 discloses an infrared imaging system using an uncooled elliptical surface section between reflective surfaces to allow a detector to perceive a cold interior of a vacuum chamber rather than a warmer surface of a structure or housing. In this way, background infrared radiation from within the system may be minimized.

GENERAL DESCRIPTION

There is a need in the art for a novel multi-optical-channel IR imager (or imaging system) allowing simultaneous IR imaging of multiple aspects of a scene. There is also a particular need for such an imager to be sufficiently small and light, enabling to eliminate or at least significantly reduce thermal noise originated in the entire imager. This is associated with the following.

Any imager has a detector element (module) which should be used with an imaging optics. According to the conventional approach in the field of IR imaging, the imaging optics is always located outside a detection module. This is because the detection module is incorporated within a cooling chamber and because imaging optics is typically of relatively high thermal mass (e.g. typically includes focus control and adjustment, as well as aberration compensation mechanisms, etc.). More specifically, the imaging optics includes one or more imaging lenses and/or mirrors, as well as a focus correction system permitting the system to remain in focus at a range of ambient temperatures, and such imaging optics is associated with mechanical assemblies and various electronics.

Thus, with the conventional approach, an IR imaging system suffers from thermal noise reducing the system performance. This thermal noise is associated with the following. On the one hand, uncooled imaging optics, located outside a cooler, is highly sensitive to temperature changes, namely the refractive index of imaging optics in the IR spectral range is highly dependent on the temperature conditions of the imaging optics. A change in the refractive index unavoidably introduce optical aberrations and focus change which require focal correction, which in turn needs the use of focus control and focus adjustment mechanisms. On the other hand, imaging optics (e.g. lenses and mechanical components), as any other object, emit thermal energy (black body radiation), which presents a noise component in the detected light thus reducing the signal to noise of the system. Some thermal noise effects associated with temperature changes in the imaging optics might be compensated by utilizing the so-called non-uniformity correction (NUC) procedure for calibration and correction of the readout signal collected from the FPA (IR) detector. However, during the use of the NUC procedure for calibration of the IR imaging system, the system is put in an inoperative state (during which the system is "blind"). It is, therefore, preferable to minimize the amount of NUC procedures that are required during the operation of the system.

Many types of detection systems utilize IR imaging for identifying and/or detecting objects. Enhanced performance of such detection systems can, in some cases, be achieved by comparing image data obtained in two or more spectral bands. In many cases, two mid-wave IR spectral bands are used.

According to the conventional approach, a dual color IR imager is configured with a monolithic dual-color Focal Plane Array (FPA) which is used in association with a single optical channel for capturing dual color IR image. Dual color IR image is refers to herein as image signals/data containing data pieces indicative of images obtained with two IR spectral bands.

As IR detection systems are progressing to provide greater accuracy and agility, there is an increasing demand for multi-color (e.g. dual-color) IR imagers that are capable of simultaneous collection and readout of the multi-color images with high frame rates, high spatial and spectral resolutions and low cross talk. Conventional dual-color IR imagers utilizing a monolithic dual-color FPA lack at least some of these requirements.

The present invention provides a novel multi-optical-channel IR imager (or imaging system) allowing simultaneous IR imaging of multiple aspects of a scene. As will be described more specifically bellow, such multiple aspects may be associated with multiple spectral bands (e.g. dual-color IR imagers as described above) and/or with other optical properties of the detection system. These may for example, include simultaneous detection of images with multiple fields-of-view, different spatial resolutions, and more.

More specifically, a dual- or multi-color IR imaging system is provided, allowing simultaneous collection and readout of the dual-/multi-color images with high frame rates and high spatial and spectral resolutions. The invention also provides a novel IR imaging system configured for relatively far field imaging, for example, imaging with a certain focus fixed at infinity and/or any other fixed distance, which when used integral with the detector dewar assembly (cooling chamber) does not need any focus correction and adjustment mechanism.

In particular, a dual-color IR imager, according to the invention, may be configured as hybrid imager including two separate optical channels which are respectively associated with two FPAs mounted in the dewar. For example the two FPAs may be two 480×384/20 µm digital InSb FPAs. To obtain complete simultaneous dual-color image, snapshot signals are integrated and read out in parallel from the two FPAs. High degree of spatial registration between the two optical channels allows to meet the above requirements. Particularly, the invention enables to obtain signals from several (two or more) spectral bands with low crosstalk between them thus allowing accurate comparison between such signals.

According to the invention, the multiple optical channels are generally associated with multiple imaging optical assemblies respectively which are cooled and temperature stabilized during the system operation. The imaging optical assemblies are typically cooled to cryogenic temperatures in order to improve the system performance (e.g. the signal to noise at the system's output) at various environmental conditions.

To this end, the imaging optical assemblies of different optical channels are preferably enclosed, or integrated with, respective cold shields which are, in turn, commonly accommodated inside the dewar. This provides a multi-channel (e.g. dual-color) IR imaging systems with reduced overall system size and weight, as well as improved performance at extreme conditions.

Utilizing cryogenically cooled imaging optics and temperature stabilized imaging optics practically eliminates the need of focus correction and also significantly reduces the need for NUC. This increases the system robustness to ambient temperature changes and minimizes the number of NUC procedures that are needed during the operation of the system. Additionally, stabilizing the temperature of the imaging optics significantly reduces the thermal radiation emitted from the imaging optics.

Thus, the invention enables a complete multi-optical-channel IR imaging system incorporated within a (cryogenically) cooled detector Dewar assembly. One or more imaging lenses of the optical channels' imaging assemblies is/are mounted inside the cooling chamber, e.g. inside a cold shield or otherwise inside the dewar vacuum space, with none or a negligible impact on the size, weight and heat load (thermal mass) of the resulting imaging system.

According to one broad aspect of the invention, there is provided an imaging system comprising: a cooling chamber associated with a cooler generating a certain temperature condition inside the chamber, said cooling chamber having an optical window, and comprising thereinside: one or more optical detectors thermally coupled to said cooler and at least two cold shields thermally coupled to said cooler and respectively carrying at least two imaging optical assemblies. The imaging optical assemblies define at least two different optical channels respectively for imaging light from said optical window onto said one or more detectors.

Each of the imaging optical assemblies comprises one or more optical elements (e.g. one or more imaging lenses). At least some of the optical elements are enclosed by, or integrated with, the cold shield of the respective imaging optical assembly and thermally coupled thereby to the cooler.

According to some embodiments of the present invention, the imaging optical assemblies, or some of them, are configured with certain fixed focuses. Such fixed focus optical imaging assembly may be formed for example by utilizing an arrangement of optical elements mounted with fixed distances between them, thus not requiring accommodation of focus adjustment/actuation mechanisms (e.g. driving/motor assemblies) within the cold shields or cooling chamber. Fixed focus optical imaging assembly may be used in order to reduce the heat capacitance of the cooled elements within the cooling chamber and accordingly reduce the required heat pumping rate.

Alternatively or additionally, according to some embodiments of the invention, one or more imaging optical assemblies are configured with focus-adjustable optics in which the focus can be adjusted to the required imaging distance and/or for compensating temperature variations in the optical elements. In such embodiments, drivers/actuators with small thermal mass, such as piezo-electric actuators, may be used for focus adjustments. Such actuators may be accommodated within the cooling chamber (e.g. within the cold shield of carrying the focus adjustable optics without inflicting substantial heat load on the cooler/cold-finger.

Hence, according to the invention, the imaging optical assemblies, their respective cold shields and the one or more detectors are maintained under substantially the same cooling temperature thereby reducing thermal noise in images detected by said one or more detectors. It should be noted that in the context of the present invention the words "light" and "IR radiation" are used interchangeably.

The cooling chamber comprises at least one cold filter. The latter may be, for example, part of the imaging optical assemblies and may be implemented as separate optical element of an optical assembly, or may be implemented as a coating on one or more optical elements of the imaging optical assemblies. In some cases one or more cold filters are exclusively associated with each of one or more imaging optical assemblies in the dewar. Alternatively or additionally, the cold filter may be common to multiple optical channels and may possibly be mounted inside the cold chamber separately from the imaging optical assemblies.

The imaging optical assembly may, for example, include a plurality of optical elements, which are spaced from one another. The optical elements typically include at least one lens. The optical elements may also include mirrors, spectral filters and/or other optical elements. Such optical elements may be mounted in a spaced-apart relationship in their respective cold shield or spaced from each other by segments of their respective cold shield.

In some examples of the invention, the infrared (IR) imaging system includes two optical channels. The optical channels may differ from one another by at least one of an imaging spectral range, direction of field of regard, field of view angle, and focal length. Different optical channels may be differently configured with respect to at least one of the type of the IR detector used, optical properties of the imaging optical assembly, and directions of light collection by the imaging optical assembly.

The optical channels allow simultaneous projection of different thermal images on one or more IR detectors. Thermal images from the multiple optical channels may be projected on the same IR detector (e.g. on different light sensitive regions thereof). Alternatively or additionally, an optical channel may be associated with a dedicated IR detector.

According to some embodiments of the invention, the optical channels are configured for projecting images onto spatially spaced apart light sensitive regions of one or more IR detectors. For example, each of the optical channels may be exclusively associated with one of the IR detectors, one of the cold shields, and with the imaging optical assembly carried by the cold shield.

According to some embodiments of the invention, the IR imaging system is associated with a single cold finger of a cryogenic cooler. In some cases, the IR detectors and the cold shields, which are accommodated in the cooling chamber, are commonly thermally coupled to the singe cold-finger. The cooling chamber incorporating the IR detector(s) and imaging optical assemblies, together with the cold shields and cold filter(s), may be very light, e.g. of about a few grams in weight.

According to another broad aspect of the invention, there is provided an imaging system comprising: a cooling chamber having an optical window and being associated with a cooler generating a certain temperature condition inside the chamber, said cooling chamber enclosing thereinside: a detection unit comprising one or more detectors thermally coupled to said cooler; and at least two cold shields thermally coupled to said cooler and carrying at least two imaging optical assemblies respectively; at least two of the imaging optical assemblies defining at least two different optical channels respectively for imaging light of at least two different spectral ranges from said optical window onto said one or more detectors.

According to yet another aspect of the invention, there is provided an imaging method comprising: (a) collecting light portions through at least two optical channels each having different optical properties and associated with its own imaging optical assembly, comprising one or more imaging lenses; and (b) imaging the collected light portions to form multiple different IR images onto multiple light sensitive regions of one or more imaging IR detectors. The imaging optical assemblies and the one or more imaging IR detectors are located inside a cooling chamber including an optical window through which IR radiation is collected to the optical channels, thereby maintaining the imaging optical assemblies under the same cooled conditions as the imaging IR detectors and reducing thermal noise in the different IR images.

As noted above, according to some embodiments of the invention, the different IR images of different optical channels are formed on multiple spatially spaced apart light sensitive regions. This provides for reducing crosstalk between the optical channels. The multiple spatially spaced apart light sensitive regions may be for example distinct regions of two or more imaging IR detectors.

Also, in some embodiments the optical assemblies are configured as fixed focus optical systems. It should be understood that the optical lens assembly (e.g. imaging optical assembly) becomes effective at stabilized low temperature, as set by the cooling requirements of the IR detector(s) optically coupled thereto (for example at 100K). This prevents the need for frequent focus and NUC, which may be required in order to compensate for the ambient temperature variations. The low temperature of the mechano-optical assembly thus significantly reduces its thermal emission, which usually contributes to spurious signal. The latter has an adverse effect on both dynamic range and spatial uniformity of the IR detector(s).

According to some embodiments of the invention, the imaging assembly(ies) may be mounted inside the cold shield or otherwise within the cooling chamber (dewar), and is preferably kept at a stabilized temperature, for example 100K for cryogenically cooled IR detectors. Such imaging assembly typically includes 2 to 4 lenses and a cold filter, and has a weigh of only a few grams, e.g. about 5 grams.

The present invention is particularly useful, but not limited to, for both wide-angle, single field-of-view (FOV) imaging, such as typically used in situational awareness, IR search & track and environmental monitoring systems. For example, hybrid dual-color imager, such as that described above, may be designed for a very wide field of view (e.g. ~140°), suited for use in airborne system.

Thus, the invented approach provides for designing a complete multi-channel IR imaging system in which the imaging optics is enclosed inside or integral with the cold shield. This is specifically useful for a cryogenically cooled IR imaging system. The cooling chamber with the integrated imaging optics can be of a practically the same size, weight and heat load as an equivalent, standard non-imaging detector Dewar assembly.

The overall imaging system can thus be significantly smaller and lighter than that utilizing a pupil-imaging external optical assembly having equivalent performance. As indicated above, the integrated optics operates at stabilized low temperature (~100K), thereby eliminating a need to adjust the system focus to compensate for temperature deviations. The cooled optics emits less spurious signal upon the IR imaging detector (e.g. FPA), thus improving the dynamic range and the residual non-uniformity noise of the detector. Due to the much smaller size and typically a fewer number of the optical elements, the cost of the integrated optics can be substantially lower that that of the conventional pupil-imaging IR optics.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
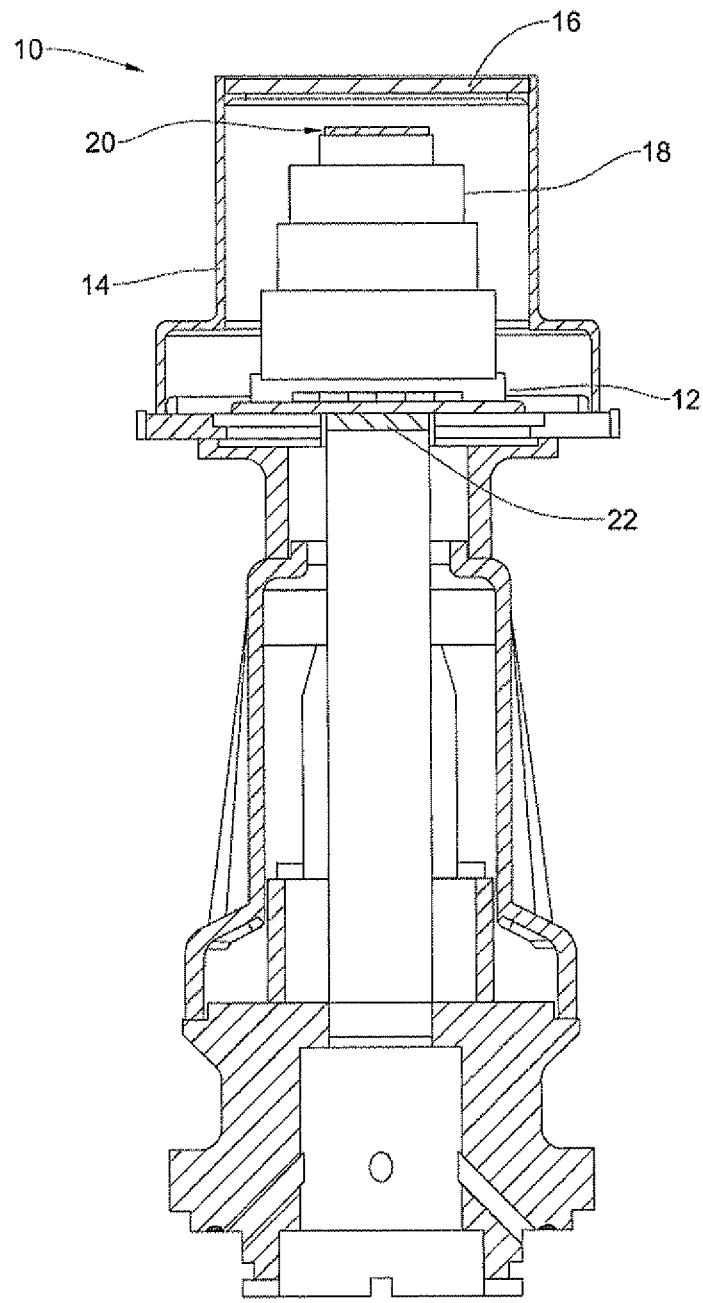
FIG. 1 is a schematic view of a conventional IR detector Dewar assembly.

FIG. 1 illustrates the IR detector Dewar assembly 10 configured according to the conventional approach. This detector assembly 10 is enclosed in a cryogenic cooling system, and for imaging applications is used with an external imaging optics. As described above, such an imaging system formed by the conventional detector assembly with external imaging optics would suffer from thermal noise and reduced performance.

Figure 2A:
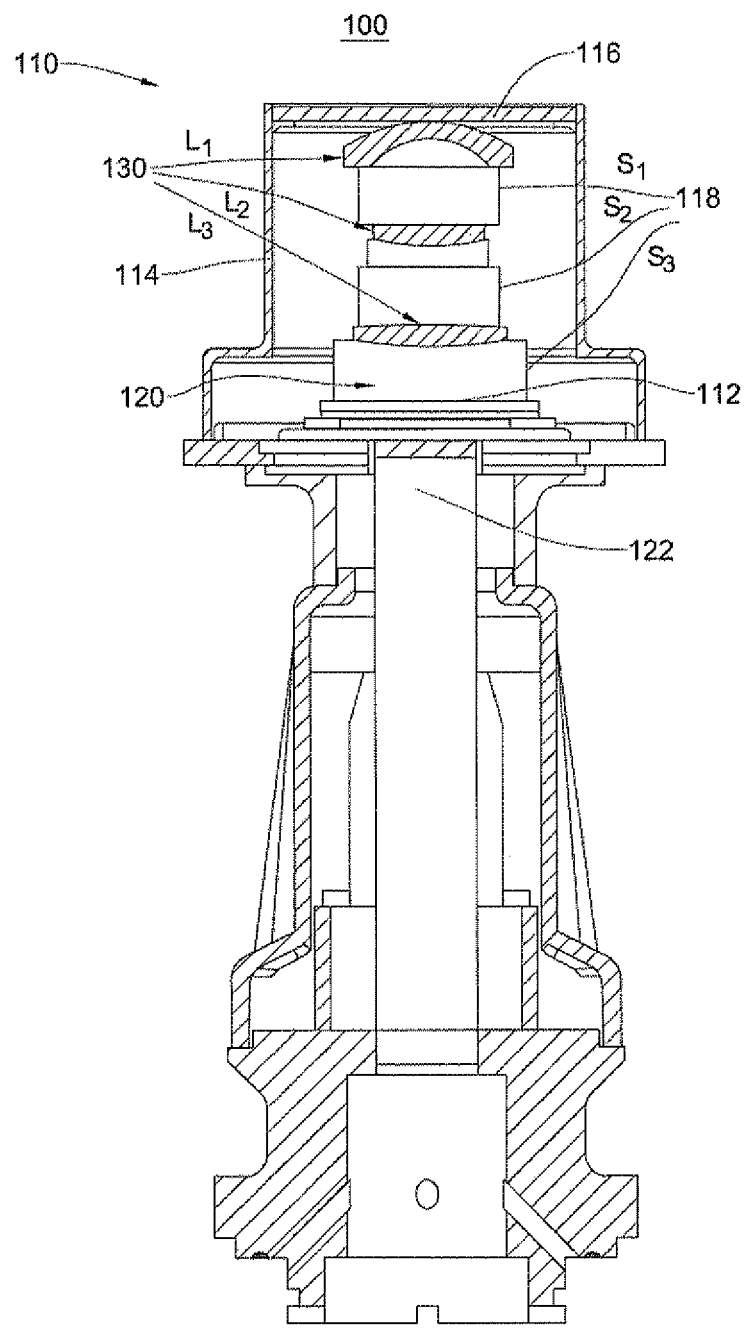
FIGS. 2A and 2B show two examples of the IR imaging system according to the invention.

Reference is made to FIG. 2A illustrating an example of an IR imaging system, generally designated 100, constructed and operable according to the invention. The system 100 is configured with a single optical channel associated with imaging of a scene with certain imaging optical properties. The system 100 is configured as an integrated system formed by a detector Dewar assembly 110 and an imaging optical assembly 130. The imaging system 100 includes a cooling chamber 114 associated with a cooler 122. Located inside the cooling chamber 114 are the detector Dewar assembly 110 and the imaging assembly 130, thus forming cryogenically cooled integrated detector Dewar assembly and imaging optics. The imaging assembly 130 is formed by one or more imaging optical elements and has a certain fixed focus per the system application. For example, this may be "far field" imaging, e.g. focused on infinity. The imaging assembly may be designed for a desired F-number and field of view.

More specifically, the detector Dewar assembly 110 has cooling chamber 114 formed with an optical window 116 ("warm window") and incorporating an imaging detector 112 coupled to a cryogenic cooler 122. A cold filter 120 is located inside the housing 114 in the optical path of light collected through the optical window and propagating towards the detector 112. Also mounted inside the housing (chamber) 114 is a cold shield 118 (located in between the optical window and the location of the imaging detector) carrying the imaging assembly 130 in a manner providing thermal coupling between the cold shield 118 and the elements of the imaging optical system 130. In the present example, the cold filter 120 is also carried by the cold shield 118 and is thermally coupled thereto. The imaging assembly 130 includes a certain number of imaging lenses, three imaging lenses $L_1$, $L_2$ and $L_3$ in the present example, arranged in a spaced-apart relationship being spaced from one another by segments $S_1$ and $S_2$ of the cold shield 118. The lens $L_3$ is spaced from the imaging detector 112 by the cold filter 120. The cold filter is a spectral filter, and may be placed at any location in the optical path of the collected light, being implemented either as a separate element or as a coating (thin film) on the lens(es). Thus, the imaging optical system is actually integral or enclosed within the cold shield 118.

Figure 2B:
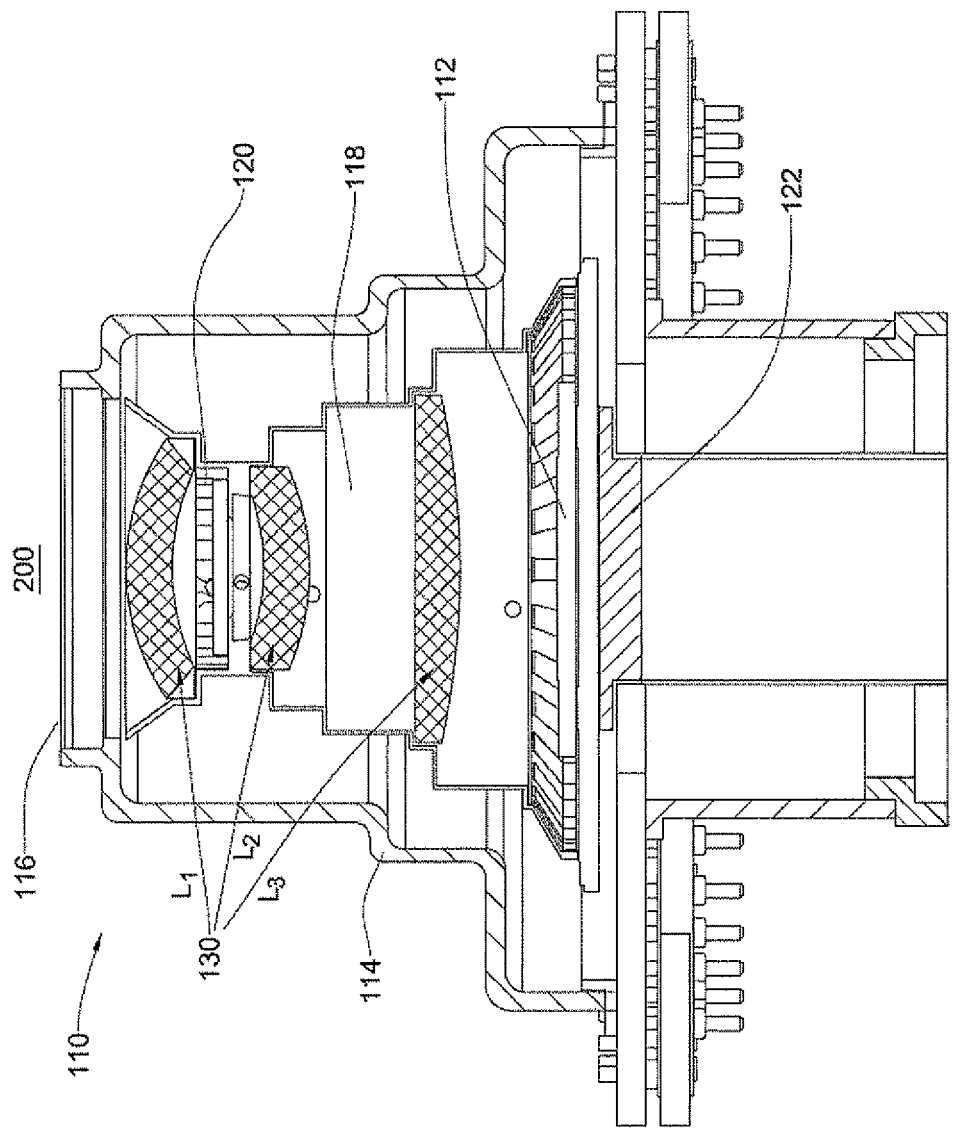

Reference is made to FIG. 2B showing another specific but not limiting example of the imaging system 200 of the invention. The system 200 is generally similar to the above described system 100, namely includes a cooling chamber 114 incorporating the detector Dewar assembly 110 and the imaging assembly 130. In the system 200, the imaging assembly 130 includes a cold filter 120 located in between lenses $L_1$ and $L_2$. Also here, the optical elements of the imaging assembly are enclosed within the cold shield 118, while in the above described system 100, these elements are integral with the segments of the cold shield.

Figure 3:
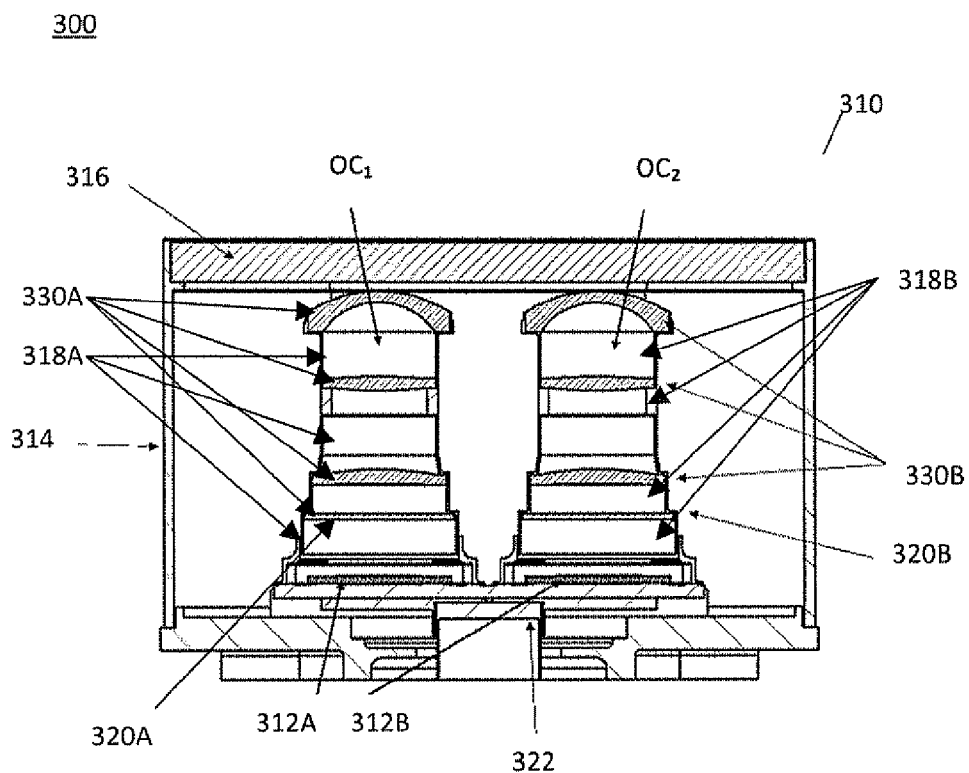
FIG. 3 shows an example of an IR imaging system according to the invention configured with multiple optical channels.

Reference is made to FIG. 3 illustrating another example 300 of an imaging system (in particular, IR imaging system) constructed and operable according to the invention. The system 300 is configured with a multiple optical channels allowing for simultaneously imaging different aspects, such as different spectral bands, of a scene on one or more IR detectors coupled to/associated with the system 300. Two such optical channels, $OC_1$ and $OC_2$, are depicted in this specific example in association with two IR detectors 312A and 312B respectively.

The system 300 is configured as an integrated system formed by a Dewar assembly 310 and two imaging optical assemblies 330A and 330B which respectively define the optical properties of the two optical channels $OC_1$ and $OC_2$. The imaging Dewar assembly 310 includes a cooling chamber 314 associated with a cooler 322 and two cold shields 318A and 318B located inside the cooling chamber 314 and configured to respectively carry the optical assemblies 330A and 330B inside the cooling chamber and provide thermal coupling between them and the cooler 322.

It should be understood that although in the present example only two optical channels, $OC_1$ and $OC_2$, are depicted, the invention is not limited in this respect and any plural number of optical channels may be provided, each associated with its own cold shield and imaging optical assembly. Also, the plurality of optical channels may be associated with any number of IR detectors. For example, several optical channels may be projecting IR images on a single IR detector (e.g. on different regions thereof), and also an optical channel may possibly project portions of an IR image on light sensitive regions of more than one IR detector.

More specifically in the present example, the detector Dewar assembly 310 has cooling chamber 314 formed with an optical window 316 ("warm window") and incorporating two imaging IR detectors 312A and 312B. The IR detectors, 312A and 312B, are coupled to a cryogenic cooler 322. As noted above, also mounted inside the chamber 314 are two cold shields 318A and 318B respectively carrying the imaging assemblies 330A and 330B in a manner providing thermal coupling between the cold shields and elements of the imaging optical assemblies. The cold shields 318A and 318B and the imaging optical assemblies 330A and 330B associated therewith are configured for thermal coupling with the cooler 322. One or more cold filters are located inside the chamber 314 in the optical path(s) of light propagating between the optical window 316 and the IR detectors 312A and 312B. The one or more cold filters are thermally coupled to the cooler. Two such cold filters 320A and 320B are depicted in the figure as optical elements, or coating of optical elements, of the optical assemblies 330A and 330B respectively. Accordingly, a cooled integrated detector Dewar assembly is provided with cooled imaging optics defining multiple thermally shielded optical channels $OC_1$ and $OC_2$.

Generally, according to the invention, the optical channels (e.g. $OC_1$ & $OC_2$) are capable of imaging different aspects of an imaged scene. Such imaging of different aspects may include for example imaging with different fields of view (e.g. wide & narrow FOV angles), imaging with different wavelength ranges (e.g. near-IR & mid-IR) and focusing on different planes (distances) within the scene (e.g. near and far field imaging). This is possible because each of the channels is associated with its own imaging optical assembly and cold shield, and possibly also with its own IR detector. Optical assemblies, associated with different optical channels, may differ from one another by optical properties such as focal length, numeric aperture, F-number, field-of-view angle and the direction of the field of regard of each optical channel.

Also, by coupling the different optical channels with different IR detectors which are sensitive to different wavelength ranges, and/or by utilizing suitable optical elements such as spectral filters, imaging with different wavelength ranges at each optical channel can be obtained.

Similarly to cold shields of conventional IR detection systems, cold shields such as 318A and 318B of the present invention, are configured to at least partially shield the optical path of their respective optical channels (e.g. $OC_1$ and $OC_2$) from thermal noise/radiation originating from out of the desired field of view of the channels. However, as noted above, in addition in the present invention the cold shields 318A and 318B are further configured to provide thermal coupling between the respective imaging optical assemblies they carry, 330A and 330B, and the cooler 322. To this end, cold shields 318A and 318B are operable for reducing thermal noise originating from within the optical path of their respective optic al channels $OC_1$ and $OC_2$, namely reducing thermal noise originating from within the desired fields of view of the optical channels. This is because the optical elements of the imaging optical assemblies 330A and 330B are thermally coupled to the cooler 322 and are thereby cooled, possibly to cryogenic temperatures. This reduces the amount of thermal emissions (blackbody radiation) from the optical elements.

Moreover, as a result of the above described thermal coupling, the imaging optical assemblies 330A and 330B are generally maintained at substantially stable temperature conditions. This substantially reduces thermal induced variations in the focal power of the imaging optical assemblies 330A and 330B and their optical elements. Since only negligible variations in the focal power are thermally induced, focus adjustment procedures for compensating such variation may be obviated. This enables use of fixed-focus imaging optical assemblies which have no focusing adjustment mechanisms.

Thus, in the example of IR imaging system 300, fixed-focus imaging optical assemblies 330A and 330B are used. This allows the IR imaging system to be lighter and energetically efficient with reduced thermal noise and improved signal to noise in its output. This is because fixed-focus optical assemblies generally include small number of optical elements (e.g. less than the number of elements required in equivalent focus adjustable optical assemblies, and typically utilize neither moving parts nor mechanical driving modules. As a result, such assemblies typically relatively low weight and relatively low thermal mass. This contributes to miniaturization of the entire IR imaging system.

It should be noted that the use of fixed focus optical assemblies is optional, but might be preferable for some applications. Indeed, the invention allows use of such fixed focus optics assemblies (e.g. for the purpose of reducing the required heat pumping load). However according to the invention, focus adjustable optical assembly may also be used in one or more of the optical assemblies of the system 300. Such focus-adjustable optics may be partially, or entirely accommodated (possibly together with corresponding focus actuation driver/module) within a cold shield of an optical-channel. Alternatively or additionally, parts of such focus-adjustable optics may also be accommodated outside the cooling chamber.

Similarly to the embodiment shown in FIG. 2A, also here each of the optical assemblies 330A and 330B includes a certain number of optical elements which are arranged in a spaced-apart relationship, spaced from one another by segments of their respective cold shields 318A and 318B. In the specific but non limiting example, three imaging lenses and a cold filter are included in each of the optical assemblies 330A and 330B. Thus, the optical assemblies 330A and 330B are configured as fixed-focus optical systems which are integrated with or enclosed by their respective cold shields 318A and 318B.

The low thermal mass of such fixed-focus optical assemblies 330A and 330B allows their accommodation in the cooling chamber without substantially increasing the cooling requirements. Namely, without substantially increasing the size and weight of the cooler 322 and without substantially increasing the energy consumption required for cooling the IR imaging system 300.

As indicated above, the present invention provides for making the entire IR imaging system 300 with very low weight. In some embodiments of the invention, the system 300 may have weight in the order of few tens grams and even in the order of few grams. Accordingly, also relatively light weight cooler 322 may be associated with the system 300.

This feature of the invention is further exploited in the embodiment of FIG. 3 to introduce multiple cooled optical channels, $OC_1$ and $OC_2$, into the cooling chamber. As noted above, the channels are associated respectively with the fixed-focus optical assemblies 330A and 330B, cold shields 318A and 318B and one or more IR detectors 312A and 312B, all being cooled by the single cooler 322. Preferably, in order to provide low weight system, a single cold finger (e.g. thermo electric cooling unit, TEC) of the cooler 322 is thermally coupled to all of the detectors, assemblies and cold shield which are accommodated in the cooling chamber 314.

It should be understood that, according to the invention, all the elements of the imaging optical system are located under the same temperature conditions, e.g. temperature conditions of the cryogenically cooled media inside the detector Dewar assembly. Accordingly, the optical path(s) defined by the imaging assembly are kept under the desired cooling conditions, e.g. at cryogenic or desired fixed temperature. As a result, the thermal noise associated with thermal emission of the optical elements along the optical path(s) is practically eliminated, and also a need to compensate for thermal aberrations, associated with the temperature dependence of the optical properties of the optical elements (e.g. refractive index), is eliminated. These properties of the imaging system of the present invention configured to operate with the fixed focus allows for making the system lighter and smaller. Indeed, the cooled system (detector and imaging optics together with cold shield and cold filter) may be configured to have a very low thermal mass and accordingly be of a very low weight (only about 5 grams) to enable reduction of the required rate of heat pumping for maintaining the system under desired temperature. Also, the system may have very small overall dimensions, close to those of a standard equivalent-performance detector Dewar assembly with no integral optics.

The invention claimed is:
1. An imaging system comprising:
a cooling chamber having an optical window and being associated with a cooler generating certain temperature conditions inside the chamber, said cooling chamber enclosing thereinside a detection unit comprising one or more detectors thermally coupled to said cooler;
wherein the system includes at least two cold shields that are accommodated inside the cooling chamber, and thermally coupled to said cooler, being a single cooler; and
wherein at least two cold shields are respectively associated with at least two imaging optical assemblies respectively defining at least two different optical channels for allowing simultaneous projection of different thermal images from said optical window of the cooling chamber onto spatially spaced apart light sensitive regions of said one or more detectors;

wherein the at least two different optical channels differ from one another by at least one of the follow:
(a) aging wavelength range;
(b) direction to a field of regard;
(c) field of view angle; and
(d) focal length;

wherein said at least two imaging optical assemblies comprise one or more lenses accommodated inside the cooling chamber and enclosed within, or integral with, said at least two cold shields and thereby thermally coupled to said cooler such that said cold shields reduce crosstalk between the optical channels;

wherein said at least two cold shields are mounted to said single cooler thereby providing a high degree of spatial registration between the two optical channels.

2. The imaging system of claim 1, wherein at least one of said at least two imaging optical assemblies is configured as a fixed focus optical system.

3. The imaging system of claim 1, wherein said at least two imaging optical assemblies are configured as fixed focus optical systems.

4. The imaging system of claim 1, configured to maintain the imaging optical assemblies of said cold shields and said one or more detectors under substantially the same cooling temperature, thereby reducing thermal noise in images detected by said detectors.

5. The imaging system of claim 1, wherein at least two imaging optical assemblies are configured for imaging light from said optical window onto spatially spaced apart light sensitive regions of said one or more detectors thereby reducing crosstalk between said optical channels.

6. The imaging system of claim 1, wherein each of said at least two different optical channels is exclusively associated with one of said detectors, with one of said cold shields and with a respective one of the imaging optical assemblies carried by said cold shield.

7. The imaging system of claim 6, wherein said at least two different optical channels have different configurations with respect to at least one of the following
(a) types of the detectors;
(b) optical properties of the imaging optical assemblies; and
(c) general directions of light collection by the imaging optical assemblies.

8. The imaging system of claim 1, wherein the detection unit comprises at least two detectors thermally coupled to a common cold-finger unit of said cooler.

9. The imaging system of claim 8, wherein said at least two cold shields are thermally coupled to said cold-finger.

10. The imaging system of claim 1, wherein at least one of the imaging optical assemblies is integral with its respective cold shield, said imaging optical assembly comprising an arrangement of a plurality of optical elements spaced from one another by segments of the cold shield.

11. The imaging system of claim 1, wherein at least one of the imaging optical assemblies is enclosed inside its respective cold shield, the imaging optical assembly comprising a plurality of optical elements mounted in a spaced-apart relationship along the cold shield.

12. The imaging system of claim 1, wherein said cooling chamber comprises at least one cold filter.

13. The imaging system of claim 1, wherein at least one of said imaging optical assemblies comprises a cold filter.

14. The imaging system of claim 13, wherein said cold filter is a coating on at least one lens of the imaging optical assembly.

15. An imaging system comprising: a cooling chamber having an optical window and being associated with a single cooler generating a certain temperature condition inside the chamber, said cooling chamber enclosing thereinside: a detection unit comprising one or more detectors thermally coupled to said cooler; at least two cold shields accommodated inside the cooling chamber, thermally coupled to said single cooler, and mechanically coupled to said single cooler to provide a high degree of spatial registration between two respective optical channels defined by said cold shield; and at least two imaging optical assemblies of said at least two different optical channels having different configurations with respect to at least one of the following:
(e) types of the detectors;
(f) optical properties of the imaging optical assemblies; and
(g) general directions of light collection by the imaging optical assemblies; for providing simultaneous projection of different respective thermal images from said optical window of the cooling chamber onto spatially spaced apart light sensitive regions of said one or more detectors that are different with respect to at least one of: spectral wavelength ranges, fields of regard, fields of view angles, and focal lengths; said at least two imaging optical assemblies comprise one or more lenses accommodated inside the cooling chamber and enclosed within, or integral with, said cold shields and thereby thermally coupled to said cooler.

16. The imaging system of claim 15, wherein at least two of the imaging optical assemblies define at least two different focal distances respectively.

17. An infrared imaging method comprising:
collecting light portions through at least two optical channels each having different optical properties and associated with its own imaging optical assembly; and
imaging the collected light portions to form multiple different IR images onto respective multiple spatially spaced apart light sensitive regions of one or more imaging IR detectors; wherein said multiple different IR images are different with respect to at least one of the following: spectral wavelength ranges, fields of regard, fields of view angles, and focal lengths;
wherein said one or more imaging IR detectors and imaging optical assemblies of said at least two optical channels are located inside a cooling chamber; said cooling chamber accommodates thereinside at least two cold shields thermally and mechanically coupled to a single cooler providing a high degree of spatial registration between said two optical channels; and said at least two imaging optical assemblies comprise one or more lenses accommodated inside the cooling chamber and enclosed within, or integral with, said at least two cold shields and thereby thermally coupled to said cooler; thereby maintaining the imaging optical assemblies under the same cooled conditions as the imaging IR detectors and reducing thermal noise in the different IR images.

18. The method of claim 17 wherein said multiple light sensitive regions are regions of two or more imaging IR detectors.

19. The method of claim 17, wherein said optical assemblies are configured as fixed focus optical systems.

* * * * *

UNITED STATES PATENT AND TRADEMARK OFFICE
CERTIFICATE OF CORRECTION

PATENT NO. : 9,194,750 B2  
APPLICATION NO. : 13/291411  
DATED : November 24, 2015  
INVENTOR(S) : Dov Oster et al.

Page 1 of 1

It is certified that error appears in the above-identified patent and that said Letters Patent is hereby corrected as shown below:

In the Claims

Column 11, Claim 1, line 5, cancel the text beginning with "from one another by at least one of the follow:" and insert --from one another by at least one of the following:--.

Column 11, Claim 1, line 6, cancel the text beginning with "(a) aging wavelength range;" and insert --(a) imaging wavelength range;--.

Signed and Sealed this
Twenty-sixth Day of April, 2016

Michelle K. Lee
*Director of the United States Patent and Trademark Office*